United States Patent Office 3,642,911
Patented Feb. 15, 1972

3,642,911
PROCESS FOR PREPARING ARYLOXYALKANOLS
Heinz Schulze, Austin, Tex., assignor to Jefferson Chemical Company, Inc., Houston, Tex.
No Drawing. Original application Apr. 1, 1968, Ser. No. 717,949, now Patent No. 3,525,773, dated Aug. 25, 1970. Divided and this application Dec. 15, 1969, Ser. No. 885,318
Int. Cl. C07c 43/20
U.S. Cl. 260—613 D
4 Claims

ABSTRACT OF THE DISCLOSURE

Aryloxyalkanols are prepared by reacting a phenol or polyphenol with an alkylene oxide in the presence of urea. The compounds prepared by the process of this invention are useful as flame retarders, solvents, intermediates for resins and biocidal agents.

CROSS-REFERENCE TO RELATED APPLICATIONS

This application is a division of my co-pending application Ser. No. 717,949 filed Apr. 1, 1968 and now Pat. No. 3,525,773.

BACKGROUND OF THE INVENTION

Field of the invention

The field of the invention is an improved chemical process for preparing aryloxyalkanols.

Description of the prior art

Pentachlorophenoxyethanol prepared by reacting pentachlorophenol with ethylene oxide is reported in Clinton W. MacMullen's U.S. Pat. 2,401,261 (1946). The formation of higher alkylene oxide adducts with phenols is a problem encountered in known processes for aryloxyalkanols. By using urea, very pure aryloxyalkanols in unexpectedly good yields are recovered which are practically free from higher alkylene oxide adducts of phenols.

The compounds prepared by the process of this invention are known from the prior art to be useful as flame retarders, solvents, intermediates and biocidal agents. For example, Italian Pat. 661,486 of Mar. 14, 1964 teaches the use of p-chlorophenoxyethanol as a pre-emergent herbicide in rice. As a further example, my U.S. Pat. 3,382,284, May 7, 1968 (Ser. No. 393,359 filed Aug. 31, 1964) illustrates the use of aryloxyalkanols as intermediates for the preparation of diols.

SUMMARY OF THE INVENTION

The invention is an improved process for preparing aryloxyalkanols which uses urea in the synthesis. The aryloxyalkanols are prepared by reacting a phenol or a polyphenol with an alkylene oxide with or without solvent and in the presence of catalytically active urea. Phenols and polyphenols useful in the practice of this invention are, for example, halogenated phenols, phenol, bisphenols, novolaks and resorcinol. Halogenated phenols are included in the terms "phenol," "polyphenol" and "aryloxyalkanols" for the purposes of this invention. Alkylene oxides useful in the practice of this invention are, for example, ethylene oxide, propylene oxide and butylene oxide.

DESCRIPTION OF THE PREFERRED EMBODIMENTS

The preparation of pentachlorophenoxyethanol and phenoxyethanol with urea of this invention is particularly advantageous over known processes. With urea, a very pure phenoxyethanol is recovered which is practically free of higher ethylene oxide adducts. The following example illustrates the invention in greater detail:

EXAMPLE

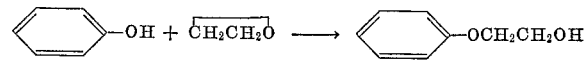

In a stainless steel stirred autoclave, 450 ml. (5 mols) phenol is reacted as in Example I, supra, with 303 ml. (6 mols) ethylene oxide in the presence of 1.2 g. (0.02 mol) urea. The reaction product contains 0.4% light boilers, 92.5% phenoxy ethanol and 7.1% high boilers. Distillation of the product through a packed column gives the following fractions:

(1) 26 g., $b_5$ 110–112° C. with 0.1% phenol and 97.6% phenoxyethanol.
(2) 577 g., $b_5$ 110–112° C., 99.9% phenoxyethanol, hydroxyl number 404, 93 parts per million nitrogen.

Fraction 2, supra, is treated with acid clay and filtered. The filtrate (309 g.) contains 99.9% phenoxyethanol, has a hydroxyl number of 406 and contains 1 part per million nitrogen.

Preferred catalyst concentrations for my invention are within the range of 0.05 mol to 0.005 mol catalyst to 1 mol phenol or polyphenol, however higher catalyst concentrations can be used.

I claim:
1. In a process for preparing aryloxyalkanols from a phenol or a polyphenol and an alkylene oxide, the improvement which comprises:
   reacting one mol of phenol or polyphenol with from about 1 to about 2 mols of ethylene oxide, propylene oxide, or butylene oxide in the presence of urea at from about 50° C. to about 170° C.
2. A process according to claim 1 wherein phenoxyethanol is prepared from phenol and ethylene oxide.
3. A process for preparing phenoxyethanol from phenol and ethylene oxide according to claim 2 wherein the urea concentration is about 0.004 mol urea to about 1 mol phenol.
4. In a process for preparing haloaryloxyalkanols from a halophenol or a polyhalophenol and an alkylene oxide the improvement which comprises:
   reacting one mol of halophenol or polyhalophenol with from about 1 to about 2 mols of ethylene oxide, propylene oxide or butylene oxide in the presence of urea at from about 50° C. to about 170° C.

References Cited

UNITED STATES PATENTS

| | | | |
|---|---|---|---|
| 2,428,235 | 9/1947 | Marple et al. | 260—613 D |
| 2,571,217 | 10/1951 | Davis et al. | 260—613 D |
| 3,148,171 | 9/1964 | St. Clair et al. | 260—615 R X |

BERNARD HELFIN, Primary Examiner

U.S. Cl. X.R.
260—613 R